United States Patent
Seong

(10) Patent No.: US 10,714,712 B2
(45) Date of Patent: Jul. 14, 2020

(54) BATTERY PACK

(71) Applicant: Samsung SDI Co., Ltd., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 42 days.

(21) Appl. No.: 14/596,117

(22) Filed: Jan. 13, 2015

(65) Prior Publication Data

US 2015/0303409 A1  Oct. 22, 2015

(30) Foreign Application Priority Data

Apr. 16, 2014 (KR) .......................... 10-2014-0045355

(51) Int. Cl.
*H01M 2/02* (2006.01)

(52) U.S. Cl.
CPC ........... *H01M 2/0202* (2013.01); *H01M 2/02* (2013.01); *H01M 2002/0205* (2013.01); *H01M 2220/30* (2013.01)

(58) Field of Classification Search
CPC ....... H01M 2002/0205; H01M 2/0202; H01M 2/02
See application file for complete search history.

(56) References Cited

U.S. PATENT DOCUMENTS

| 6,977,124 B2 | 12/2005 | Probst et al. |
| 7,901,809 B2 | 3/2011 | Kim |
| 8,216,705 B2 | 7/2012 | Cho et al. |
| 8,475,950 B2 | 7/2013 | Lim |
| 2003/0017390 A1* | 1/2003 | Probst ................ H01M 2/361 429/176 |
| 2006/0051667 A1* | 3/2006 | Kim .................... H01M 2/22 429/184 |
| 2007/0154782 A1* | 7/2007 | Cho .................. H01M 2/0207 429/56 |
| 2007/0202393 A1* | 8/2007 | Hu ................... H01M 2/0469 429/53 |
| 2010/0086850 A1* | 4/2010 | Kim .................... H01M 2/22 429/211 |

(Continued)

FOREIGN PATENT DOCUMENTS

| CA | 2 394 387 AI | 1/2003 |
| CN | 1224934 A | 8/1999 |

(Continued)

OTHER PUBLICATIONS

EPO Search Report dated Aug. 31, 2015, for corresponding European Patent application 15163704.8, (5 pages).

(Continued)

*Primary Examiner* — Jimmy Vo

(74) *Attorney, Agent, or Firm* — Lewis Roca Rothgerber Christie LLP

(57) ABSTRACT

A battery pack includes a can having a curvature and an opening at a side thereof; an electrode assembly accommodated in the can; a cap assembly including a cap plate sealing the opening of the can and an electrode pin in a center of the cap plate; and an insulating case between the electrode assembly and the cap assembly, the insulating case including a first insulating unit and a second insulating unit that are separated from each other.

17 Claims, 3 Drawing Sheets

(56) References Cited

U.S. PATENT DOCUMENTS

| | | | |
|---|---|---|---|
| 2010/0136415 A1* | 6/2010 | Ahn | H01M 2/0482 429/162 |
| 2010/0266879 A1* | 10/2010 | Byun | H01M 2/1235 429/53 |
| 2011/0097615 A1 | 4/2011 | Goh et al. | |
| 2011/0318634 A1 | 12/2011 | Uh et al. | |
| 2012/0129012 A1* | 5/2012 | Baek | H01M 2/0217 429/7 |
| 2012/0183825 A1 | 7/2012 | Lee et al. | |

FOREIGN PATENT DOCUMENTS

| | | |
|---|---|---|
| CN | 100411225 C | 8/2008 |
| EP | 0 928 035 A1 | 7/1999 |
| EP | 0928035 A1 | 7/1999 |
| EP | 2 477 267 A1 | 7/2012 |
| JP | 6-181069 A | 6/1994 |
| JP | 11-273709 A | 10/1999 |
| JP | 2003-162985 A | 6/2003 |
| JP | 2006-93151 A | 4/2006 |
| JP | 2012-151110 A | 8/2012 |
| JP | 2012-252934 A | 12/2012 |
| JP | 2013-93287 A | 5/2013 |
| JP | 2014-32967 A | 2/2014 |
| KR | 10-2007-0097856 | 10/2007 |
| KR | 10-2011-0034312 A | 4/2011 |
| KR | 10-2011-0073405 A | 6/2011 |
| KR | 10-2012-0000486 A | 1/2012 |
| KR | 10-2013-0097840 | 9/2013 |

OTHER PUBLICATIONS

SIPO Office Action, with English translation, dated Sep. 11, 2018, for corresponding Chinese Patent Application No. 201510154951.9 (20 pages).

Chinese Patent Office Action with English Translation for corresponding Chinese Patent Application No. 201510154951.9, dated Apr. 29, 2019, 12 pages.

Chinese Patent Third Office Action with English Translation for corresponding Chinese Patent Application No. 201510154951.9, dated Sep. 30, 2019, 18 pages.

Korean Office Action dated Apr. 28, 2020, for corresponding Korean Patent Application No. 10-2014-0045355 (8 pages).

* cited by examiner

BATTERY PACK

CROSS-REFERENCE TO RELATED APPLICATION

This application claims priority to and the benefit of Korean Patent Application No. 10-2014-0045355, filed on Apr. 16, 2014 in the Korean Intellectual Property Office, the disclosure of which is incorporated herein in its entirety by reference.

BACKGROUND

1. Field

One or more embodiments of the present invention relate to a battery pack.

2. Description of the Related Art

Due to, for example, the development of wireless Internet and communication technologies, use of portable electronic devices that operate using a battery instead of an external power supply device has increased. Among the portable electronic devices, mobile computers are small and can be easily transported and, thus, are widely used for personal and work purposes. The mobile computers may include a battery pack that allows them to be used in various places regardless of the availability of the external power supply devices. The battery pack may include a plurality of unit batteries that may be repeatedly charged and discharged so as to provide a sufficient power output.

As the portable electronic device market has expanded, the portable electronic devices are provided in various shapes according to users' needs. Accordingly, the demands for battery packs that are appropriate for portable electronic devices of various shapes have increased. For example, along with the users' increasing interest in curved portable electronic devices, the desire for curved battery packs have also increased.

SUMMARY

One or more embodiments of the present invention include a battery pack structure.

Additional aspects of the present invention will be set forth in part in the description which follows and, in part, will be apparent from the description or may be learned by practice of the presented embodiments.

According to an embodiment of the present invention, a battery pack includes a can having a curvature and an opening at a side of the can; an electrode assembly accommodated in the can; a cap assembly including a cap plate and an electrode pin in a center of the cap plate, the cap plate being configured to seal the opening of the can; and an insulating case between the electrode assembly and the cap assembly and including a first insulating unit and a second insulating unit that are separated from each other.

The first and second insulating units may be on the same plane.

The first and second insulating units may each have a long end and a short end. Respective long ends of the first and second insulating units may have the same length, and respective short ends of the first and second insulating units may have the same length.

The first and second insulating units may be symmetrically arranged about the electrode pin.

An angle between the first and second insulating units may be in accordance with the curvature of the can.

The insulating case may have a first lead through-hole and a second lead through-hole. The first lead through-hole may be in the first insulating unit, and the second lead through-hole may be in the second insulating unit.

The first insulating unit may have an electrolyte solution inlet.

The first lead through-hole may be at a side of the first insulating unit, and the electrolyte solution inlet may be at another side of the first insulating unit.

The electrode assembly may be curved according to the curvature of the can.

The cap assembly may be curved according to the curvature of the can.

The electrode pin may have a first polarity, and the cap plate may have a second polarity that is different from the first polarity.

The cap assembly may further include: an insulating plate under the cap plate; and a terminal plate under the insulating plate.

The electrode assembly may include a first electrode plate having a first polarity, a second electrode plate having a second polarity, and a separator between the first and second electrode plates. A side of the terminal plate may be electrically coupled to the second electrode plate, and another side of the terminal plate may be electrically coupled to the electrode pin.

The electrode pin may contact another side of the terminal plate by extending through the cap plate and the insulating plate.

A curvature radius of the can may be in a range from about 170 mm to about 200 mm.

According to another embodiments of the present invention, a battery pack includes a can having an opening and being curved in a lengthwise direction thereof to have a curvature; an electrode assembly accommodated in the can; a cap assembly including a cap plate sealing the opening of the can and an electrode pin in a center of the cap plate; and an insulating case between the electrode assembly and the cap assembly, wherein the insulating case is separated at a center thereof where the electrode pin is located.

The insulating case may include a first insulating unit and a second insulating unit, and the first and second insulating units may be on the same plane and may be separated from each other.

An angle between the first and second insulating units may be in accordance with the curvature of the can.

The first and second insulating units may respectively have a first lead through-hole and a second lead through-hole.

The first insulating unit may have an electrolyte solution inlet. The first lead through-hole may be at a side of the first insulating unit, and the electrolyte solution inlet may be at another side of the first insulating unit.

BRIEF DESCRIPTION OF THE DRAWINGS

These and/or other aspects of the present invention will become apparent and more readily appreciated from the following description of the embodiments, taken in conjunction with the accompanying drawings in which.

DETAILED DESCRIPTION

Figure 1:
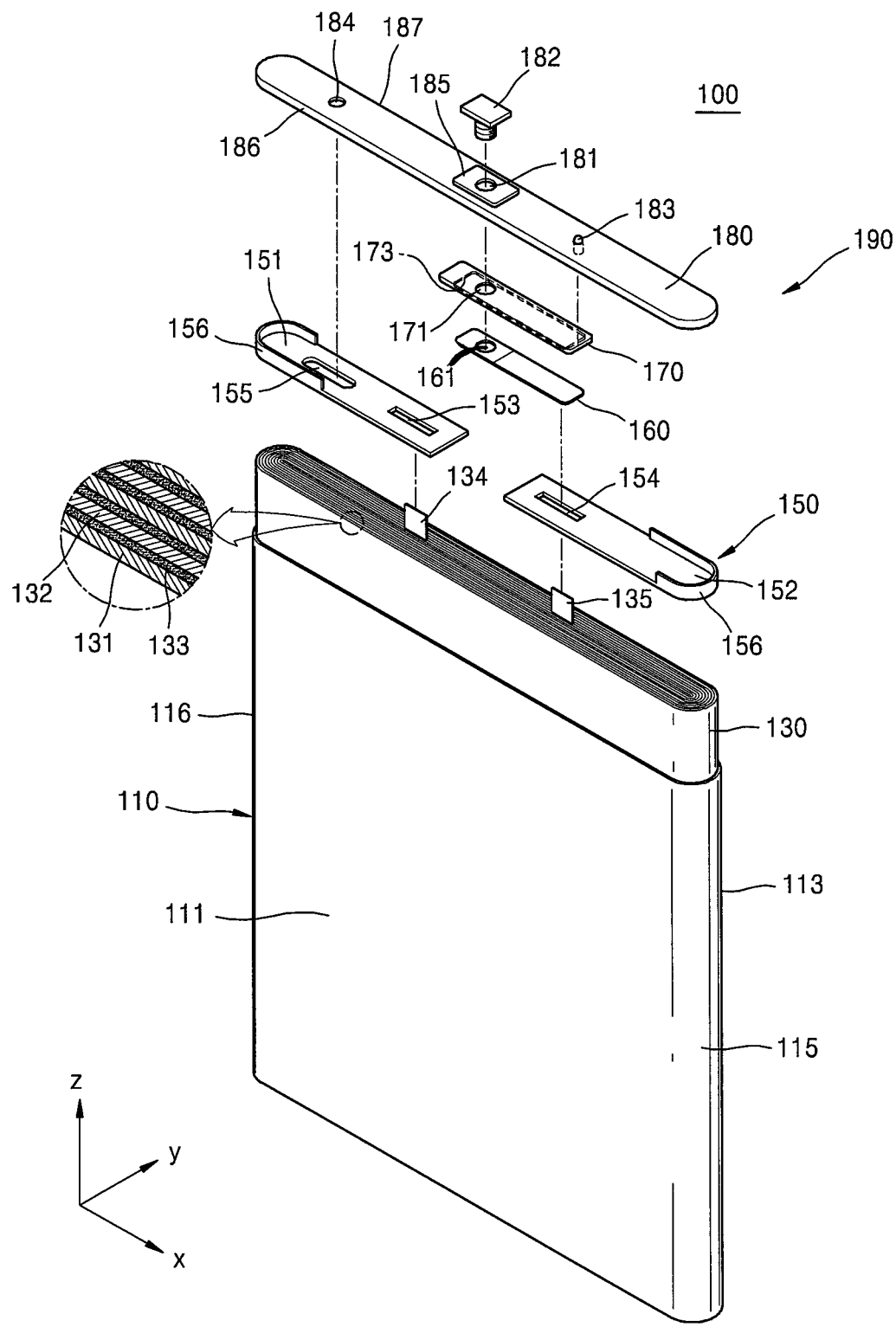
FIG. 1 is an exploded perspective view schematically illustrating a battery pack according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that although the terms "first", "second", etc. may be used herein to describe various components, these components should not be limited by these terms. These components are only used to distinguish one component from another. Furthermore, when a first element is described as being "coupled" or "connected" to a second element, the first element may be directly coupled or connected to the second element or the first element may be indirectly coupled or connected to the second element via one or more intervening elements.

As used herein, the singular forms "a," "an", and "the" are intended to include the plural forms as well, unless the context clearly indicates otherwise.

It will be further understood that the terms "includes", "including", "comprises", and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

In the following examples, the x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

Sizes of elements in the drawings may be exaggerated for convenience of explanation. In other words, because sizes and thicknesses of components in the drawings may be arbitrarily illustrated for convenience of explanation, the following embodiments are not limited thereto.

Figure 2:
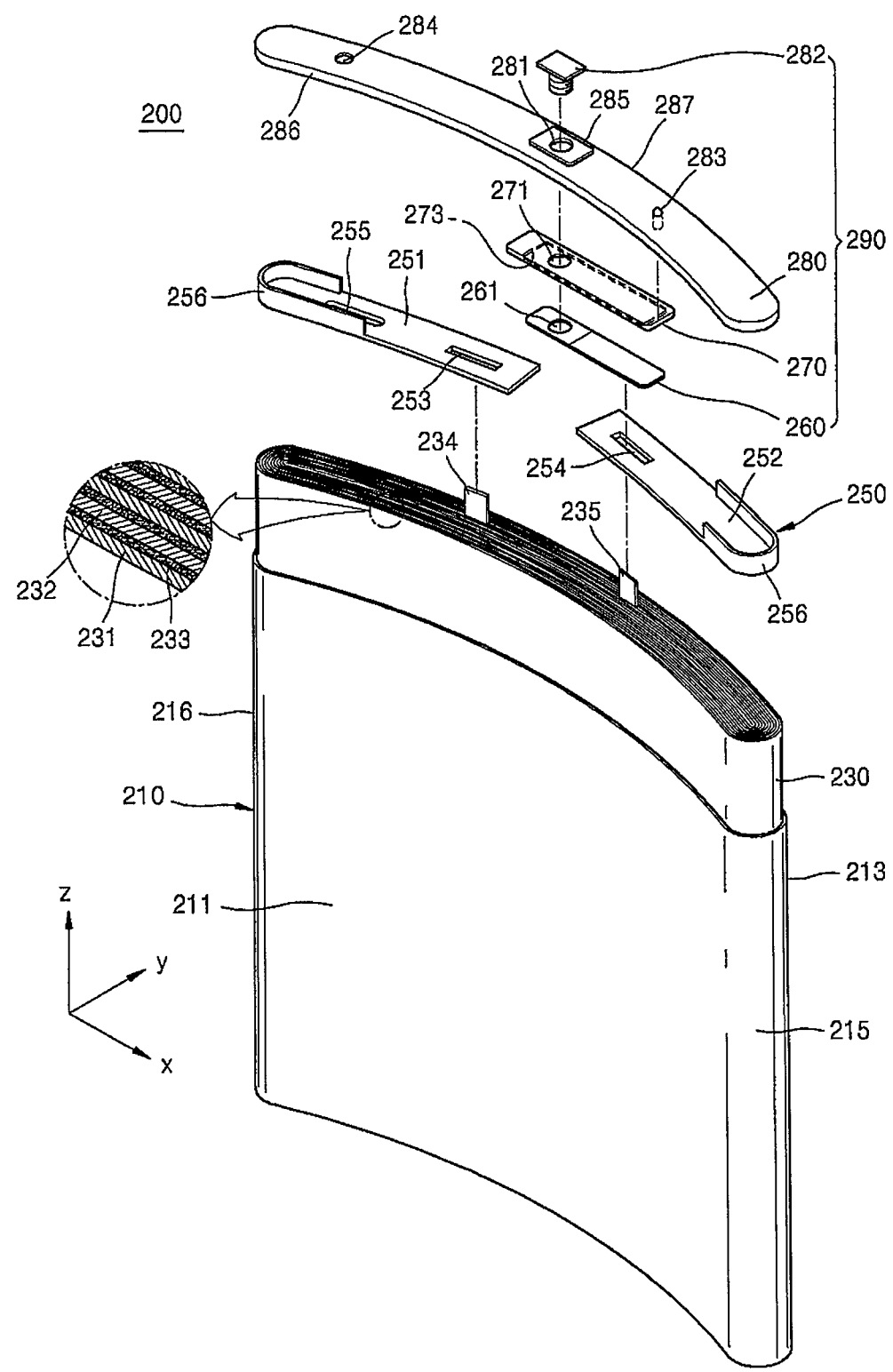
FIG. 2 is an exploded perspective view schematically illustrating a modified embodiment of the battery pack shown in FIG. 1 which has been curved by applying pressure thereon.
Figure 3:
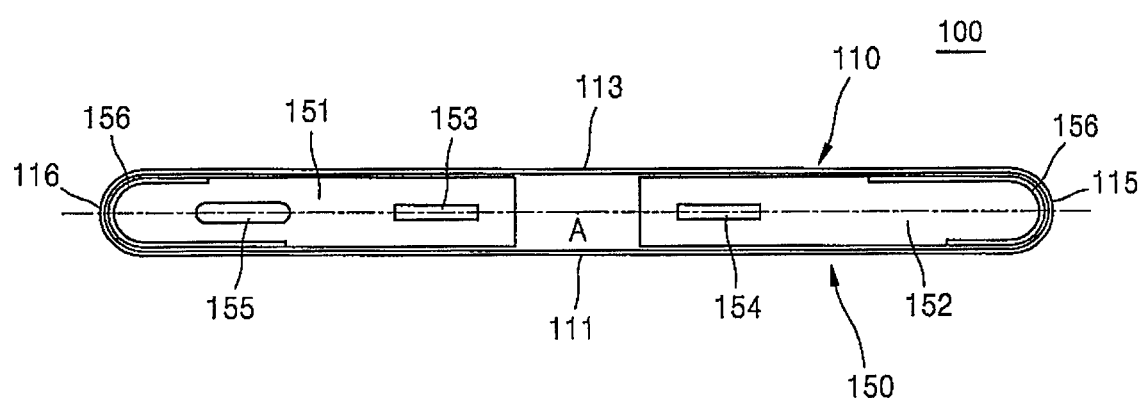
FIG. 3 is a plan view schematically illustrating the battery pack shown in FIG. 1.
Figure 4:
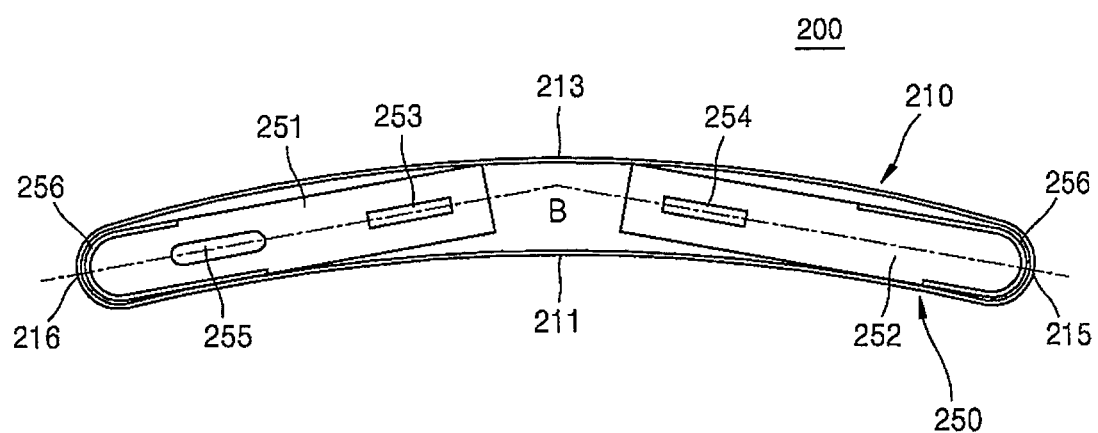
FIG. 4 is a plan view schematically illustrating the battery pack shown in FIG. 2.

FIG. 1 is an exploded perspective view schematically illustrating a battery pack 100 according to an embodiment of the present invention. FIG. 2 is an exploded perspective view schematically illustrating the battery pack 100 shown in FIG. 1 which has been bent by applying pressure thereon. FIG. 3 is a plan view schematically illustrating the battery pack 100 shown in FIG. 1. FIG. 4 is a plan view schematically illustrating the battery pack 200 shown in FIG. 2. Hereinafter, first, the battery pack 100 is described, and then the battery pack 200 is described.

Referring to FIG. 1, the battery pack 100 according to an embodiment of the present invention may include a can 110, an electrode assembly 130, an insulating case 150, and a cap assembly 190. The battery pack 100 is a secondary battery that is designed to be rechargeable and may be, for example, a lithium-ion battery.

The can 110 has an opening at a side and may be defined by a first main wall 111, a second main wall 113 facing the first main wall 111, a first connecting wall 115 connecting an end of the first main wall 111 and an end of the second main wall 113, and a second connecting wall 116 connecting the other end of the first main wall 111 and the other end of the second main wall 113. The can 110 has an opening and an inner space that are surrounded by the first and second main walls 111 and 113 and the first and second connecting walls 115 and 116. The can 110 may accommodate the electrode assembly 130 in the inner space by inserting the electrode assembly 130 into the opening.

The can 110 may have an approximately hexahedral shape with an opening at an upper portion thereof and may be formed of a metallic material so that the can 110 may be curved by applying pressure thereon. For example, the can 110 may be manufactured by using aluminum or an aluminum alloy. After the electrode assembly 130 is inserted in the can 110 through the opening, the opening may be sealed by a cap plate 180. Like the can 110, the cap plate 180 may be manufactured by using a metallic material, such as aluminum or an aluminum alloy. A portion where the cap plate 180 and the can 110 contact each other may be welded using laser so as to tightly seal the can 110.

The electrode assembly 130 may include a first electrode layer 131, a second electrode layer 132, and a separator 133 between the first and second electrode layers 131 and 132. The electrode assembly 130 may have a structure in which a plurality of first electrode layers 131, a plurality of second electrode layers 132, and a plurality of separators 133 are stacked. For example, the electrode assembly 130 may have a jelly-roll structure in which the plurality of first electrode layers 131, the plurality of second electrode layers 132, and the plurality of separator 133 are wound around one another. However, for convenience of description, the description will focus on the electrode assembly 130 having a jelly-roll structure formed by winding the first electrode layer 131, the second electrode layer 132, and the separator 133.

The first electrode layer 131 may be any one of a positive electrode film or a negative electrode film. When the first electrode layer 131 is a positive electrode film, the second electrode layer 132 may be a negative electrode film and vice versa. That is, the first and second electrode layers 131 and 132 have electrical polarities different from each other and are not limited to a certain polarity. However, for convenience of description, an embodiment in which the first electrode layer 131 is formed of a positive electrode film and the second electrode layer 132 is formed of a negative electrode film will be mainly described.

The first electrode layer 131 may include a first metal collector and a first active material portion formed by coating a first active material on a surface of the first metal collector. Likewise, the second electrode layer 132 may include a second metal collector and a second active material portion formed by coating a second active material on a surface of the second metal collector.

When the first electrode layer 131 is a positive electrode film, the first metal collector may be a positive electrode collector and the first active material portion may be a positive active material portion. Also, when the second electrode layer 132 is a negative electrode film, the second metal collector may be a negative electrode collector and the second active material portion may be a negative active material portion. Elements and aspects of the positive and negative electrode collectors and the positive and negative active material portions may be well-known elements and aspects of secondary batteries in the art and, thus, detailed description thereof may be omitted.

The separator 133 may be a porous polymer layer, may be in the form of a woven or non-woven fiber including polymer fibers, may include ceramic particles, and may be formed of a polymer solid electrolyte. The separator 133 may be formed of, for example, polyethylene (PE) or polypropylene (PP). The separator 133 may be formed by using an independent film or by forming a non-conductive porous layer on the first electrode layer 131 or the second electrode layer 132.

The separator 133 is formed to electrically separate the first and second electrode layers 131 and 132 from each other. A form of the separator 133 may not be the same as a form of the first electrode layer 131 or a form of the second electrode layer 132.

An electrode plate may be formed of a first electrode plate 134 (e.g., a first electrode tab) and a second electrode plate 135 (e.g., a second electrode tab) having polarities different from each other. The first and second electrode plates 134 and 135 are provided to electrically couple (e.g., electrically connect) the electrode assembly 130 to the outside (e.g., to an external device). The first electrode plate 134 is electrically coupled to the first electrode layer 131 to have a positive polarity, and the second electrode plate 135 is electrically coupled to the second electrode layer 132 to have a negative polarity.

The insulating case 150 is disposed (or located) between the electrode assembly 130 and the cap assembly 190 so as to electrically insulate the electrode assembly 130 and the cap assembly 190 from each other. The insulating case 150 is mounted at an inner side of the opening of the can 110 in which the electrode assembly 130 is accommodated.

The insulating case 150 may include a first insulating unit 151 and a second insulating unit 152. The first and second insulating units 151 and 152 may be disposed on the same plane. The first and second insulating units 151 and 152 may be separated from each other by an interval (e.g., by a predetermined interval), and thus, the insulating case 150 may be separated at the center thereof as illustrated in FIG. 1. The first and second insulating units 151 and 152 may each have a long end and a short end. Although FIG. 1 illustrates that short ends of the first and second insulating units 151 and 152, which contact the can 110, are rounded, shapes of the short ends are not limited thereto. The first and second insulating units 151 and 152 may have the same size (e.g., the same dimensions), and accordingly, respective long ends of the first and second insulating units 151 and 152 may be the same (e.g., may have the same length) and respective short ends of the first and second insulating units 151 and 152 may be the same (e.g., may have the same length). The first and second insulating units 151 and 152 may be symmetrically disposed with respect to an electrode pin 182 in a center of the cap plate 180.

A supporting unit 156 may be provided on a side of each of the first and second insulating units 151 and 152. The insulating case 150 may be stably mounted at the inner side of the can 110 by using the supporting unit 156. Although FIG. 1 illustrates that the supporting unit 156 of the insulating case 150 is provided at the short ends of the first and second insulating units 151 and 152, a shape of the supporting unit 156 is not limited thereto and the supporting unit 156 may extend to the long ends or be modified in other various ways.

As described above, because the insulating case 150 electrically insulates the electrode assembly 130 and the cap assembly 190 from each other, the insulating case 150 may be formed of insulating polymer resin. Examples of insulating polymer resin include PP, PE, polyimide (PI), polyphenylenesulfide (PPS), polyethersulfone (PES), or polyphenyleneoxide (PPO).

The cap assembly 190 may include the cap plate 180, an insulating plate 170, a terminal plate 160, and the electrode pin 182.

The cap plate 180 seals the opening of the can 110 to protect the electrode assembly 130 that is provided in the inner space of the can 110. The cap plate 180 may have the same shape as the opening of the can 110. Therefore, the cap plate 180 may include a first side 186 that corresponds to the first main wall 111, and a second side 187 that corresponds to the second main wall 113. For example, the cap plate 180 may include the first side 186 that is coupled to the first main wall 111 and the second side 187 that contacts and is coupled to second main wall 113.

The electrode pin 182 may be disposed on the cap plate 180. A gasket 185 may be provided between the electrode pin 182 and the cap plate 180 in order to prevent a short circuit between the electrode pin 182 and the cap plate 180. The gasket 185 may be formed of an insulating material and may prevent an electrical short circuit between the electrode pin 182 and the cap plate 180.

The electrode pin 182 may be disposed in the center of the cap plate 180. Because the electrode pin 182 is in the center of the cap plate 180, the cap plate 180 may include an anchor portion 183 at a side thereof and an electrolyte solution inlet 184 at the other side thereof.

The electrode pin 182 may be electrically coupled to the second electrode plate 135 via a terminal through-hole 181 formed at the center of the cap plate 180. For example, the first electrode plate 134 may be electrically coupled to the cap plate 180, and the second electrode plate 135 may be electrically coupled to the electrode pin 182. Because the first and second electrode plates 134 and 135 have polarities different from each other, the cap plate 180 and the electrode pin 182 that are respectively coupled to the first and second electrode plates 134 and 135 also have polarities that are different from each other. For example, the cap plate 180 may have a positive polarity, and the electrode pin 182 may have a negative polarity. In this case, the gasket 185 may be provided between the electrode pin 182 and the cap plate 180 in order to prevent a short circuit between the electrode pin 182 and the cap plate 180. The gasket 185 may be formed of an insulating material and may prevent an electrical short circuit between the electrode pin 182 and the cap plate 180.

The electrolyte solution inlet 184, through which an electrolyte solution is injected into the can 110 and is then sealed, may be formed on the cap plate 180. The electrolyte solution inlet 184 may be sealed by using a sealing stopper after injecting the electrolyte solution.

The insulating plate 170 and the terminal plate 160 may be disposed under the cap plate 180. The insulating plate 170 may be disposed under the cap plate 180 and may be formed of the same insulating material as the gasket 185. A terminal through-hole 171, through which the electrode pin 182 is inserted, is formed on the insulating plate 170 at a location corresponding to the terminal through-hole 181 of the cap plate 180. An accommodation hole 173 is formed at a lower portion of the insulating plate 170 to have a size corresponding to the terminal plate 160 so as to accommodate the terminal plate 160.

The terminal plate 160 is formed of a conductive material, such as a nickel (Ni) alloy, and may be coupled to the lower portion of the insulating plate 170 to form an electrical path between the electrode pin 182 and the second electrode plate 135. A side of the terminal plate 160 may contact (e.g., electrically contact) the second electrode plate 135, and other side of the terminal plate 160 may contact (e.g., electrically contact) the electrode pin 182. For example, a terminal through-hole 161, through which the electrode pin 182 is inserted, is formed in the terminal plate 160 at a location corresponding to the terminal through-hole 181 of the cap plate 180. Because the electrode pin 182 is insulated from the cap plate 180 by the gasket 185 while being coupled to the second electrode plate 135 via the terminal through-hole 181 of the cap plate 180, the terminal plate 160 may be electrically insulated from the cap plate 180 and electrically coupled to the electrode pin 182.

The cap plate 180 may include the anchor portion 183 that protrudes from a lower surface of the cap plate 180 so as to fix the insulating plate 170 and the terminal plate 160. The anchor portion 183 may fix the insulating plate 170 and the terminal plate 160 in respective positions so as to prevent a short circuit.

Referring to FIG. 2, the battery pack 200 according to an embodiment of the present invention may include a can 210, an electrode assembly 230, an insulating case 250, and a cap assembly 290. The battery pack 200 is a modified example of the battery pack 100 shown in FIG. 1 and is formed by applying a pressure to the battery pack 100 so as to curve it. Accordingly, except for an external shape of the battery pack 200 that is different due to the pressure applied to the can 110, other elements of the battery pack 200 are the same or substantially the same as those of the battery pack 100 shown in FIG. 1. Therefore, detailed description of elements and features that are the same or substantially the same in both FIGS. 1 and 2 may be omitted, and the description will focus on aspects of the can 210, the electrode assembly 230 inserted in the can 210, a cap plate 280, and the insulating case 250.

The battery pack 200 according to an embodiment of the present invention may include the can 210 that is curved along a horizontal direction to have a curvature (e.g., a predetermined curvature). That is, when the pressure is applied to the can 210, a first main wall 211 and a second main wall 213 of the can 210 are curved to have curvatures (e.g., predetermined curvatures).

When the first and second main walls 211 and 213 of the can 210 each have a curvature (e.g., a predetermined curvature), the electrode assembly 230 provided at an inner space of the can 210 is curved according to the first and second main walls 211 and 213. In this embodiment, when the electrode assembly 230 is provided in the inner space of the can 210, the electrode assembly 230 and the can 210 may be concurrently (e.g., simultaneously) or independently modified to be curved.

When the can 210 is modified to be curved, the cap plate 280 that seals an opening of the can 210 may also be curved according to the first and second main walls 211 and 213. A first side 286 of the cap plate 280, which is coupled to the first main wall 211, is formed to have the same curvature as the first main wall 211 so as to contact and be coupled to the first main wall 211, and a second side 287 of the cap plate 280 is formed to have the same curvature as the first main wall 213 so as to be coupled to the second main wall 213.

The cap plate 280 may be provided in the opening of the can 210 and then be modified at the same time as (e.g., concurrently with) the can 210 to be curved. For example, after providing the electrode assembly 230 in the inner space of the can 210, the cap plate 280 and the can 210 may be sealed by, for example, welding. Then, pressure may be applied to the first and second main walls 211 and 213 so as to concurrently (e.g., simultaneously) curve the first and second main walls 211 and 213, the electrode assembly 230, and the first and second sides 286 and 287 of the cap plate 280 to have respective curvatures.

Also, after the cap plate 280 and the can 210 are curved, the cap plate 280 may be inserted in the opening of the can 210 to seal the opening. The can 210 and the cap plate 280 may be formed of a metallic material, such as aluminum or an aluminum alloy, and accordingly, the can 210 and the cap plate 280 may be curved by applying pressure thereon or be changed by other various ways.

A curvature radius of the can 210 is not limited to a certain or predetermined value and may be determined by users. For example, the curvature radius of the can 210 may be in a range from about 170 mm to about 200 mm, thereby allowing a user to conveniently use an electronic device that includes the battery pack 200. Furthermore, the cap plate 280, which seals the opening of the can 210, may be curved such that a curvature radius of the cap plate 280 is the same or substantially the same as the curvature radius of the can 210.

As illustrated in FIG. 2, the insulating case 250 may be separated at the center thereof and, thus, be divided into a first insulating unit 251 and a second insulating unit 252. The first and second insulating units 251 and 252 may be disposed on the same plane and may be separated from each other by an interval (e.g., a predetermined interval). Also, the first and second insulating units 251 and 252 may be symmetrically arranged about an electrode pin 282 (e.g., symmetrically arranged about a center between the first and second insulating units 251 and 252).

Because the can 210 is curved, the first and second insulating units 251 and 252 may be disposed relative to each other at an angle B (refer to FIG. 4) according to a curvature of the can 210. Hereinafter, FIG. 3, which illustrates the insulating case 150 of the battery pack 100 that is not modified (e.g., that is not curved), and FIG. 4, which illustrates the insulating case 250 of the battery pack 200 that is modified (e.g., that is curved), will be compared.

Referring to the battery pack 100 shown in FIG. 3, the insulating case 150, which is accommodated in the can 110 to insulate the cap assembly 190 and the electrode assembly 130 from each other, may be separated at the center thereof and be divided into the first and second insulating units 151 and 152. For example, as illustrated in FIG. 3, the first and second insulating units 151 and 152 may be separated from each other by an interval (e.g., a predetermined interval) and accommodated in the can 110, while the supporting unit 156 of the insulating case 150 is in contact with the inner side of the can 110. The first and second insulating units 151 and 152 may each be disposed on the same plane. In this embodiment, the first and second insulating units 151 and 152 may be disposed such that the first and second insulating units 151 and 152 are aligned along a lengthwise direction. Therefore, an angle A that is formed between the first and second insulating units 151 and 152 may be equal to about 180°.

The respective long ends of the first insulating unit 151 and the second insulating unit 152 may have the same length, and the respective short ends of the first insulating unit 151 and the second insulating unit 152 may have the same length. That is, the first and second insulating units 151 and 152 may have the same size. Accordingly, the first and second insulating units 151 and 152 may be symmetrically disposed with respect to the center in which the electrode pin 182 is disposed.

The insulating case 150 may include first and second lead through-holes 153 and 154, through which the first and second electrode plates 134 and 135 respectively pass so that the first and second electrode plates 134 and 135 may be electrically coupled to the cap plate 180 and the electrode pin 182, respectively. For example, the first lead through-hole 153 may be provided in the first insulating unit 151, and the second lead through-hole 154 may be provided in the second insulating unit 152. FIG. 3 illustrates that the first lead through-hole 153 is disposed at a side of the first insulating unit 151 and at a location symmetrical to the location of the second lead through-hole 154 disposed in the second insulating unit 152. However, respective locations of the first and second lead through-holes 153 and 154 are not limited thereto and may vary according to different embodiments. Also, the first lead through-hole 153 may be disposed at a side of the first insulating unit 151 as described above, and an electrolyte solution inlet 155 may be disposed at another side of the first insulating unit 151.

Referring to the battery pack 200 shown in FIG. 4, the can 210 may be curved along a horizontal direction to have a curvature (e.g., a predetermined curvature). FIG. 4 illustrates that the opening of the can 210 is curved along a lengthwise direction thereof, and the opening of the can 210 may extend along the lengthwise direction thereof. The curved shape may be formed by applying pressure on the battery pack 100 illustrated in FIG. 1 or 3. The can 210 may be formed of a metallic material, and thus, a shape of the can 210 may be easily modified by applying pressure thereon. The insulating case 250 electrically insulates the electrode assembly 230 and the cap assembly 290 from each other and may be formed of an insulating polymer resin, such as PP, PE, or PI, as described above. Therefore, unlike the can 210, the insulating case 250 may have characteristics different from those of a metallic material, such as flexibility or conductivity, and thus, may not be easily modified or curved by applying pressure thereon. Also, due to such characteristics, electrode plates 234 and 235, which respectively pass through lead through-holes 253 and 254 in the insulating case 250, may break when a shape of the battery pack 200 is modified or may interfere with the insulating case 250.

Therefore, according to an embodiment of the present invention, a shape of the battery pack 100 may be easily modified by applying pressure thereon, and thus, the battery pack 200 includes the first and second insulating units 251 and 252 that are formed by separating the insulating case 250 at the center thereof. Therefore, the insulating case 250 and the electrode plates 234 and 235 may be prevented from being damaged due to changes in the shape of the battery pack 200.

For example, as illustrated in FIG. 4, the insulating case 250 may be disposed such that the first and second insulating units 251 and 252 form the angle B with respect to each other as the battery pack 200 is curved. The angle B formed between the first and second insulating units 251 and 252 may be smaller than the angle A formed between the first and second insulating units 151 and 152 shown in FIG. 3, and the angle B may have various values less than about 180° according to the curvature radius of the can 210.

The battery pack 200 according to an embodiment of the present invention may be modified by forming various curvatures according to a shape of the electronic device with which the battery pack 200 is to be used and/or installed, thereby improving the space use efficiency of the electronic device.

As described above, according to the one or more of the above embodiments of the present invention, a battery pack with improved durability and safety is implemented.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A battery pack comprising:
   a can having a curvature along a horizontal direction thereof and an opening at a side of the can in a height direction thereof;
   an electrode assembly accommodated in the can;
   a cap assembly comprising a cap plate and an electrode pin in a center of the cap plate, the cap plate being configured to seal the opening of the can;
   a first insulating unit between the electrode assembly and the cap assembly;
   a second insulating unit between the electrode assembly and the cap assembly, the first and second insulating units being separated from each other and movable independently of each other, the first and second insulating units each being planar members with two straight first sides and two second sides extending between the straight first sides, the straight first sides being longer than the second sides and being straight along the curvature direction of the can; and
   first and second supporting units respectively protruding from the first and second insulating units toward the cap plate,
   wherein the first insulating unit has a first lead through-hole, and the second insulating unit has a second lead through-hole, and
   wherein an angle between the first and second insulating units is in accordance with the curvature of the can.

2. The battery pack of claim 1, wherein the first and second insulating units are on the same plane.

3. The battery pack of claim 2,
   wherein respective first sides of the first and second insulating units have a same length and respective second sides of the first and second insulating units have a same length.

4. The battery pack of claim 2, wherein the first and second insulating units are symmetrically arranged about the electrode pin.

5. The battery pack of claim 1, wherein the first insulating unit has an electrolyte solution inlet.

6. The battery pack of claim 5, wherein the first lead through-hole is at a side of the first insulating unit, and
   wherein the electrolyte solution inlet is at another side of the first insulating unit.

7. The battery pack of claim 1, wherein the electrode assembly is curved according to the curvature of the can.

8. The battery pack of claim 1, wherein the cap assembly is curved according to the curvature of the can.

9. The battery pack of claim 1, wherein the electrode pin has a first polarity, and the cap plate has a second polarity that is different from the first polarity.

10. The battery pack of claim 1, wherein the cap assembly further comprises:
an insulating plate under the cap plate; and
a terminal plate under the insulating plate.

11. The battery pack of claim 10, wherein the electrode assembly comprises a first electrode plate having a first polarity, a second electrode plate having a second polarity, and a separator between the first and second electrode plates, and
wherein a side of the terminal plate is electrically coupled to the second electrode plate and another side of the terminal plate is electrically coupled to the electrode pin.

12. The battery pack of claim 10, wherein the electrode pin contacts another side of the terminal plate by extending through the cap plate and the insulating plate.

13. The battery pack of claim 1, wherein a curvature radius of the can is in a range from 170 mm to 200 mm.

14. The battery pack of claim 1, wherein the first lead through-hole is elongated in a first direction, and the second lead through-hole is elongated in a second direction, and
wherein an angle between the first direction and the second direction is less than 180°.

15. A battery pack comprising:
a can comprising a first main wall, a second main wall, and first and second connecting walls respectively extending between the first and second main walls, having an opening, and being curved in a lengthwise direction thereof to have a curvature;
an electrode assembly accommodated in the can, the electrode assembly comprising a first electrode layer, a second electrode layer, and a separator between the first and second electrode layers;
a cap assembly comprising a cap plate sealing the opening of the can and an electrode pin in a center of the cap plate;
a first electrode plate electrically connected to the first electrode layer of the electrode assembly and protruding from the electrode assembly toward the cap plate;
a second electrode plate electrically connected to the second electrode layer of the electrode assembly and protruding from the electrode assembly toward the cap plate;
an insulating structure between the electrode assembly and the cap assembly, the insulating structure comprising a first insulating unit and a second insulating unit separated from each other at a center of the insulating structure where the electrode pin is located and movable independently of each other, each of the first and second insulating units having two straight first sides and two second sides extending between the straight first sides, the straight first sides being longer than the second sides and being straight along the curvature direction of the can; and
first and second supporting units respectively protruding from the first and second insulating units toward the cap plate,
wherein the first and second insulating units respectively have a first lead through-hole and a second lead through-hole, and
wherein the first electrode plate extends through the first lead through-hole of the first insulating unit and the second electrode plate extends through the second lead through-hole of the second insulating unit, and
wherein an angle between the first and second insulating units is in accordance with the curvature of the can.

16. The battery pack of claim 15, wherein the first and second insulating units are on the same plane and are separated from each other to be movable independently of each other.

17. The battery pack of claim 16, wherein the first insulating unit has an electrolyte solution inlet,
wherein the first lead through-hole is at a side of the first insulating unit, and
wherein the electrolyte solution inlet is at another side of the first insulating unit.

* * * * *